March 14, 1967
S. N. VINES
3,309,173
PROCESS FOR RECOVERING INORGANIC MATERIALS
Filed Aug. 7, 1964
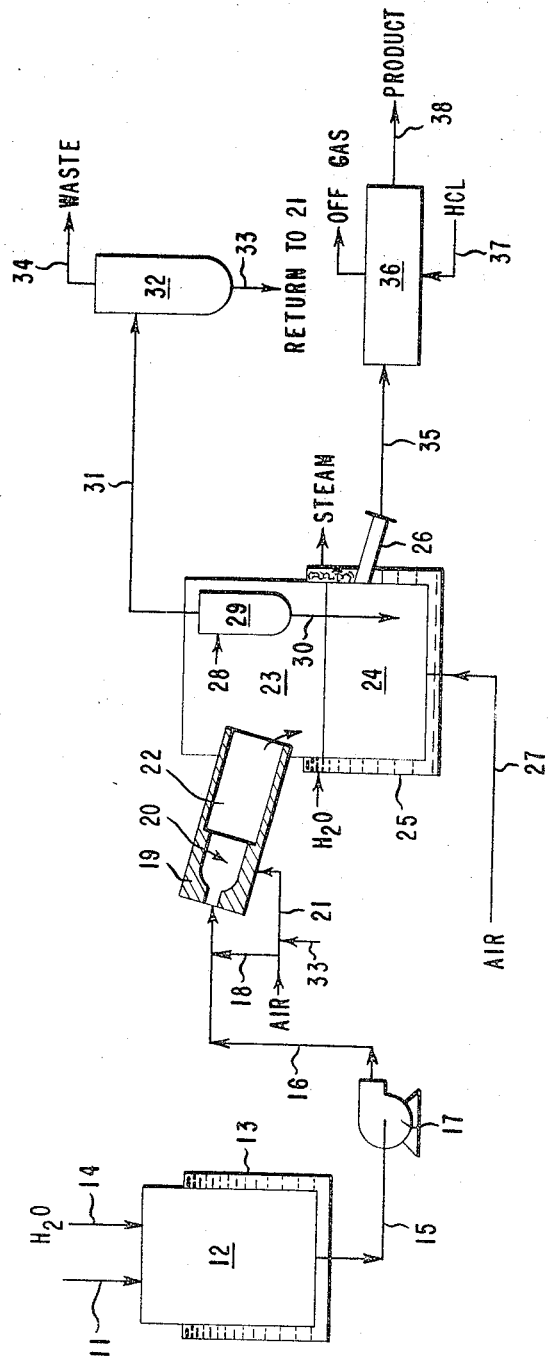
INVENTOR
STERLING N. VINES
BY
ATTORNEY United States Patent Office 3,309,173
Patented Mar. 14, 1967

3,309,173
PROCESS FOR RECOVERING INORGANIC MATERIALS
Sterling N. Vines, Memphis, Tenn., assignor to E. I. du Pont de Nemours and Company, Wilmington, Del., a corporation of Delaware
Filed Aug. 7, 1964, Ser. No. 388,256
4 Claims. (Cl. 23—97)

This invention relates to the recovery of copper values from anhydrous catalyst solutions used in the catalytic conversion processes. A preferred embodiment of this invention is concerned with treatment of spent anhydrous catalyst solutions containing copper compounds in organic solvents and reaction by-products, formed in the conversion of acetylene to vinyl derivatives such as the production of acrylonitrile from acetylene and hydrogen cyanide, and the recovery of copper values therefrom.

A well-known commercial process for producing acrylonitrile involves continuously passing hydrogen cyanide and acetylene through a reactor containing an aqueous solution of cuprous chloride catalyst at a temperature of 70° to 100° C. The resulting liquid phase reaction produces a variety of by-products in addition to the desired acrylonitrile. The more volatile by-products pass out of the reactor with the acrylonitrile and unreacted hydrogen cyanide and acetylene. This off-gas passes to a recovery system where the acrylonitrile is separated and purified. A mixture of non-volatilized by-products accumulates in the reactor and will soon stop the process unless it is removed. This mixture of by-products is a dark, tarry material which is reasonably fluid at the reaction temperature but solidifies when cooled to room temperature. These tars are insoluble in water, so it is a relatively easy matter to separate them from an aqueous catalyst solution to avoid an excessive accumulation in the reaction system, as by draining the tar layer from the reactor.

The use of non-aqueous solutions of cuprous chloride in organic liquids is an improvement over the use of aqueous catalyst solutions because it reduces by-product formation, e.g., the formation of acetaldehyde by the reaction of acetylene with water. Furthermore, anhydrous catalyst solutions of cuprous chloride in combinations of organic liquid solvent for cuprous chloride with certain organic liquid catalyst promoters, both being volatile at a higher temperature than the acrylonitrile produced so that the product separation is readily effected, have been found which also provide important improvements in productivity, by greatly increasing the activity and useful life of the catalyst. However, tarry by-products formed are soluble in the organic liquids used. The by-products dilute the catalytic reaction medium, increase its viscosity, and cause the productivity per unit volume of catalyst to decrease when the concentration reaches about 20% of tar. The operation becomes uneconomical at tar concentrations approaching 30%. It is, therefore, necessary to replace catalyst medium to avoid an excessive concentration of dissolved tars, either continuously or intermittently, with fresh components at a rate which will remove undesirable amounts of tar from the system. Since disposal of such tarry mixtures is a troublesome problem and the components of anhydrous catalyst solutions are expensive, an effective process for recovery of copper values and solvent therefrom, and preferably as suitable for reuse as catalyst medium for the process, is highly desirable.

Similar problems are involved in preparing other vinyl derivatives from acetylene using anhydrous catalyst solutions containing copper compounds. In the preparation of monovinylacetylene, which is an intermediate in the manufacture of chloroprene and in which cuprous chloride is used as the catalyst, the disposal of tarry mixtures is a problem when anhydrous catalyst solutions are used.

It is an object of this invention to provide a process for recovering copper values from anhydrous liquid catalyst after use in the synthesis of vinyl derivatives. Another object is to provide a process for recovering copper values from anhydrous liquid catalyst after use in the synthesis of acrylonitrile and monovinylacetylene. A more specific object is to provide such a process for recovering these copper values in a form suitable for reuse in making up catalyst solutions for the acrylonitrile process. Still other objects will become apparent from the detailed description which follows and the accompanying drawing in which the figure illustrates in diagrammatic form apparatus for carrying out the process of the present invention.

In accordance with this invention, copper values are recovered from catalyst mixtures of cuprous chloride and high molecular weight organic materials in which some of the cuprous chloride is combined therewith. Specifically, it has been found that anhydrous catalyst solution containing copper compounds and non-volatile tarry by-products resulting from use in the production of vinyl derivatives can be effectively treated to accomplish the above objectives by removing the volatile organic liquids from the catalyst solution to form a desolvated mixture, heating the desolvated catalyst in the range of from 800° to 1800° C. to effect the complete combustion of organic components present in the desolvated catalyst, quenching the combustion products to a temperature between about 400° and 100° C. and recovering the solid products from said quenching step. This solid product which is a mixture of cuprous chloride and cuprous oxide may be converted substantially to pure cuprous chloride by post treatment with HCl at a temperature of from 50° to 150° C. for reuse as catalyst.

The anhydrous catalyst solution to be treated in accordance with the invention normally will have accumulated non-volatile tarry by-products to the extent that catalyst replacement in whole or in part becomes advisable for continued operation of the product synthesis. Generally, the by-product or tars content will exceed about 10% by weight of the catalyst solution before recovery of values becomes advisable, but recovery becomes necessary when this content exceeds about 30%. The organic solvent used in preparing acrylonitrile may be any of a large class of known organic solvents for cuprous chloride. One such class of solvents is the organic nitriles disclosed in U.S. Patent 2,920,098 of Burrus et al. The spent anhydrous catalyst medium will also usually contain a small amount, up to about 10% by weight, of an organic catalyst promoter known to the art as the amide types disclosed in U.S. Patent 2,999,072 of Rowbottom, or U.S. Patent 2,999,073 of Harris. In preparing monovinylacetylene, the cuprous salt may be dissolved in a carboxylic acid amide in the presence of a hydrochloride of a primary or secondary non-aromatic amine, e.g., N,N-dimethylformamide and dimethylamine hydrochloride as disclosed in Apotheker U.S. Patent 2,875,258.

In general, the volatile organic liquid(s) may be effectively removed by vaporization through azeotropic distillation, distillation at ordinary pressures, or vacuum distillation. Vacuum distillation is preferred because recoveries of the solvent are higher and corrosion of equipment lower than at atmospheric pressures. Suitable vacuum distillation conditions are temperatures between about 125° C. to 210° C. with a vacuum between about 20 to 100 mm. of mercury pressure. Any other suitable scheme for substantially desolvating the spent catalyst medium may be employed without departing from the scope of the invention. For example, recovery of the solvent may be effected by extraction with another solvent such as methanol.

The desolvated catalyst mixture contains by-product tars and copper values, the latter being present principally as the copper compounds, CuCl and CuCN, although some other forms as well as some metallic copper may be present. In accordance with the invention, this mixture is then fed to a combustion zone together with an excess of air and heated to a temperature range of from 800° to 1800° C. to burn away substantially all of the organic components remaining in said mixture. This combustion step may be carried out conveniently in a vortex burner. It is preferable to feed the desolvated catalyst mixture to the burner as a water slurry containing approximately 50% by weight solids. The water and excess air assist in maintaining temperature control in the combustion zone so that the final temperature of combustion does not exceed the decomposition temperature of CuCl and $Cu_2O$ which is approximately 1800° C. As a result of the combustion step, substantially all of the carbon present in the desolvated catalyst mixture is burned off, the cuprous chloride content is volatilized, and the balance of the copper values present in the solid residue is converted to cuprous oxide.

The combustion products, both vapor and solid, coming from the combustion zone are then quenched to a temperature below the melting point of cuprous chloride, namely below about 422° C. and above about 100° C., preferably between 300° and 100° C. This step may be readily accomplished in a fluidized solids cooler well known in the art. A quenching temperature well below the melting point of cuprous chloride is desirable since this obviates the problem of molten particles and massive agglomeration in the fluidized bed. It has been found in accordance with this invention that cuprous chloride is activated by trace amounts of absorbed water and under such conditions at mildly elevated temperatures will readily convert to the unwanted cupric form. Therefore, it is desirable to carry out the quenching step at a temperature above the absorption point of water vapor present in the combustion gases.

The solid product recovered from the quenching step is approximtaely 60% to 75% by weight cuprous chloride, with the balance being predominantly cuprous oxide. This product may be substantially converted to cuprous chloride for reuse in the acrylonitrile process by treatment with HCl. The latter may be accomplished by treating the copper compounds in the solid state with anhydrous HCl at temperatures of about 50° to 150° C. Alternatively, the copper compounds may be suspended in the desired organic solvent for the reaction catalyst medium and then treated with anhydrous HCl at mildly elevated temperatures.

In a preferred embodiment for carrying out the invention diagrammatically represented in the figure of the drawing, used catalyst is treated in a suitable vessel such as a Dopp kettle, not shown, to remove organic liquids, i.e., organic solvent and a promoter, if present, by vaporization and form a desolvated catalyst mixture comprising the copper compounds and by-product tars. This desolvated catalyst mixture is fed through line 11 to a slurry tank 12 which is provided with a heating jacket 13 for heat input to the catalyst mixture. Water enters the slurry tank 12 by line 14 and is stirred with the catalyst mixture to form a water slurry of about 50% solids which is then transferred through lines 15 and 16 by pump 17. After being atomized with air introduced into line 16 through line 18, the catalyst mixture is fed into a high efficiency vortex burner 19 where it is burned at a temperature ranging from 800° to 1800° C. with an excess of air which is introduced into the combustion zone 20 of burner 19 through line 21. The excess air and water assist in holding the maximum temperature of combustion in combustion zone 20 below 1800° C., thereby avoiding decomposition of the copper compounds present in the catalyst. Burner 19 is mounted at a slight downward angle from a horizontal plane and discharges directly into the side of quenching chamber 23 by means of conduit 22 which forms an airtight connection with burner 19 and quenching chamber 23. The combustion products entering quenching chamber 23 from combustion zone 20 involve vapors composed chiefly of combustion gases and volatilized cuprous chloride and a pulverulent mass of non-volatile copper compounds. Quenching chamber 23, provided with a cooling jacket 25, contains a fluidized bed 24 of previously quenched copper compounds to effect rapid cooling of the combustion products. This is made feasible by the wall-to-solids heat transfer coupled with a turnover of pulverulent copper compounds in bed 24 by the continuous withdrawal of a pulverulent mass from withdrawal tube 26 for post-treatment discussed hereinafter.

The bed 24 is maintained in a uniformly fluidized condition with air introduced at the bottom of quenching chamber 23 by means of line 27. The depth of fluidized bed 24 is maintained sufficiently below the entry point of the combustion products via conduit 22 to provide a cooling surface on the walls of the quencher and also to provide sufficient free volume above the bed so that, on shutdown in a non-fluidized condition, the copper compound bed will come to rest below the entry point of the combustion products in order to avoid fusion of a portion of the bed in the hot zone adjacent conduit 22. Operation of the fluidized bed can be readily carried out in a temperature range from 100° to 300° C. whereby the combustion products entering quenching chamber 23 are rapidly cooled with the cuprous chloride being condensed in the bed and only the combustion gases remaining in the vapor state. The latter, as off-gases, are passed by means of line 28 into an internal cyclone 29 to recover some entrained copper compound fines which are returned by stand pipe 30 to bed 24. The off-gases from cyclone 29 are transferred by line 31 outside quenching chamber 23 to a second cyclone 32 for removal of further fines. These latter fines are returned by means of line 33 to line 21 for recycle through burner 19 by entrainment in the secondary combustion air present in line 21. The off-gases from cyclone 32 are exhausted to the atmosphere by means of line 34 as waste after water scrubbing to remove trace amounts of toxic materials.

The pulverulent mass of copper values, principally a mixture of cuprous chloride and cuprous oxide, is transferred from the quenching chamber 23 by means of withdrawal tube 26 and line 35 to a rotary contactor 36. The cuprous oxide portion of the mixture is converted to cuprous chloride within rotary contactor 36 by treatment with HCl gas which is introduced therein by means of line 37. The mixture within contactor 26 is maintained at a temperature of about 50° to 150° C. and the conversion of cuprous oxide to cuprous chloride readily progresses with time in the presence of water vapor formed as the product of cuprous oxide and hydrogen chloride. The final product, cuprous chloride, is removed from contactor 36 by means of line 38 and may be pneumatically conveyed to storage bins or to an anhydrous catalyst makeup tank for reuse.

The following examples illustrate specific embodiments of the invention:

*Example 1*

A catalyst solution prepared in accordance with the teaching of Rowbottom U.S. Patent 2,999,072 was used in the preparation of acrylonitrile. Acetylene and hydrogen cyanide were fed to the catalyst in a mol ratio of about 7.5 to 1.0. A predetermined quantity of catalyst solution having the following composition was continuously removed from the reaction:

|  | Percent |
|---|---|
| Cuprous chloride | 30 |
| Cuprous cyanide | 13 |
| Benzonitrile | 25 |
| N,N'-dimethylformamide | 8 |
| Acrylonitrile | 3 |
| Tar | 21 |

A quantity of the catalyst solution, containing 1387 grams of copper and tarry substance, was treated at a temperature of 150° C. and under a vacuum of 25 mm. of mercury absolute. The desolvated catalyst mixture, containing the copper compounds and by-product tars, was then fed to a slurry tank where water was introduced to form a 50% solids slurry. The water slurry after being atomized with air was fed into a cast refractory combustion zone fired with a propane-air torch, where the mixture was burned at a temperature of about 1000° C. The combustion products then entered a zone containing a fluidized bed quencher in which the quenching bed was Ottawa sand. The temperature of the fluidized bed was maintained in the range between 175° and 230° C. The amount of copper recovered was found to be 1274 grams, indicating a recovery efficiency of about 91.9%. Since no copper value left the unit with the off-gases, the remaining 8.1% is attributed to mechanical feed losses. The off-gas stream leaving the combustion zone and the solid products recovered were analyzed to determine their composition. The anaylsis is set forth in Table 1, which follows:

TABLE 1

| Analyses | Cu | CuCl | CuCl$_2$[1] | Cu$_2$O | CuO[1] | O$_2$ | CN- | Cl$_2$ | CO$_2$ | CO |
|---|---|---|---|---|---|---|---|---|---|---|
| Copper Content of Final Bed, Percent | | 79.5 | 10.2 | | 10.3 | | | | | |
| Total Recovered Material, Percent | | 53.8 | 5.7 | 19.7 | 14.8 | | | | | |
| Off-Gas, Percent | 0.00003 | | | | | 14 | [2]ND | 0.003 | 9 | 0.11 |

[1] Cupric content attributed to oxidation following test run due to moisture-oxygen action on the cuprous salts. Subsequent tests with cuprous salts maintained in inert atmosphere and dried air yield no cupric formation.
[2] Not detected.

*Example II*

The procedure of Example I was repeated except that the copper in the feed was 492 grams, the combustion temperature 980° C., and the fluidized bed temperature 200° to 260° C. The copper recovered amounted to 444 grams, indicating an efficiency for the process of about 90.5%. As in Example I, remainder is attributed to mechanical losses. Data obtained from an analysis of the drawoff from the fluidized bed and the off-gases are set forth in Table 2, which follows:

TABLE 2

| Analyses | Cu+ | Cu++ | O$_2$ | CN- | Cl$_2$ | CO$_2$ | CO |
|---|---|---|---|---|---|---|---|
| Drawoff From Fluidized Bed,[1] Percent | 2.31 | 0.23 | | | | | |
| Off-Gas, Percent | [2]ND | | 14.5 | [2]ND | [2]ND | 7.6 | [2]ND |

[1] No specific compounds determined. Percent of total copper present as cuprous form is 87.9%. Remainder cupric copper attributed to oxidation following sampling due to moisture-oxygen action on the cuprous salts.
[2] Not detected.

*Example III*

The copper compounds recovered in Example I are introduced into a rotary contactor to which hydrogen chloride gas is fed. The mixture of gas and copper compounds is maintained at a temperature of about 100° C. The product removed from the contactor is analyzed and found to be cuprous chloride.

Catalyst compositions other than that described in the examples can be used in the process of this invention. The particular composition is not critical except that the organic materials which make up the tarry substances must be combustible at a temperature below the decomposition temperature of the copper compounds which are present in the catalyst. The tarry substance is difficult to analyze and in processes for preparing acrylonitrile in which acetylene and hydrogen cyanide are used, the tars probably represent a polymeric reaction product of acetylene and hydrogen cyanide which contains nitrile, amide, and aromatic groups. As mentioned previously, used catalyst from a process for preparing monovinyl acetylene may be treated by the process of this invention. The procedure outline in the foregoing examples may be followed with optimum conditions being selected, depending on the particular solvents and proportions of other materials present.

As many widely different embodiments of this invention may be made without departing from the spirit and scope thereof, it is to be understood that this invention is not to be limited to the specific embodiments thereof except as defined in the appended claims.

I claim:
1. A process for the recovery of copper values from a substantially anhydrous catalyst mixture containing copper compounds dissolved in a volatile organic solvent and non-volatile tarry by-products which comprises
   (1) vaporizing the volatile organic solvent from the catalyst mixture to provide a copper-containing desolvated residue.
   (2) heating the desolvated copper-containing residue obtained by step (1) to a temperature in the range from about 800° to 1800° C. to effect combustion of organic components in said desolvated copper-containing residue,
   (3) recovering copper-containing combustion products and residue obtained by step (2), quenching said products and residue at a temperature in the range below about 422° C. and above about 100° C., and recovering solid copper values from the products resulting from the quenching step.
2. The process of claim 1 wherein said mixture contains cuprous chloride and benzonitrile.

3. A process for the recovery of copper values from used anhydrous acrylonitrile catalyst mixture containing copper compounds dissolved in a volatile organic solvent and non-volatile tarry by-products from the synthesis of acrylonitrile which comprises
   (1) vaporizing said volatile organic solvent from said catalyst mixture, to provide a copper-containing desolvated residue,
   (2) heating the desolvated copper-containing residue of said catalyst mixture in the range of from 800° to 1800° C. to effect the combustion of organic components present in said copper-containing residue,
   (3) recovering the products resulting from step (2), quenching said product at a temperature in the range of from 400° to 100° C., and
   (4) recovering solid copper values from the product resulting from the quenching step.

4. A process for the recovery of copper values from used anhydrous acrylonitrile catalyst mixture containing cuprous chloride dissolved in benzonitrile and non-volatile tarry by-products from the synthesis of acrylonitrile which comprises
   (1) vaporizing said benzonitrile from said catalyst mixture to provide a copper-containing desolvated residue,
   (2) heating the desolvated copper-containing residue in the range of from about 1000° to 1800° C. to effect the combustion of organic components present in said copper-containing residue,
   (3) recovering the products resulting from step (2), quenching said products at a temperature in the range of from 300° to 100° C., and
   (4) treating the solid product recovered from said quenching step with HCl at a temperature of from 50° to 150° C.

References Cited by the Examiner

Handbook of Chem. and Physics, Chem. Rubber Publishing Co., Cleveland, Ohio (1954), pages 510–513 relied on.

OSCAR R. VERTIZ, *Primary Examiner.*

A. J. GREIF, *Assistant Examiner.*